(12) United States Patent
Sieradzki

(10) Patent No.: US 11,760,017 B2
(45) Date of Patent: Sep. 19, 2023

(54) SYSTEM FOR AUTOMATED SUCCESSIVE THREE-DIMENSIONAL PRINTING

(71) Applicant: R3 Printing, Inc., Wilmington, DE (US)

(72) Inventor: Paul Sieradzki, Los Angeles, CA (US)

(73) Assignee: R3 Printing, Inc., Wilmington, DE (US)

( * ) Notice: Subject to any disclaimer, the term of this patent is extended or adjusted under 35 U.S.C. 154(b) by 0 days.

(21) Appl. No.: 17/645,245

(22) Filed: Dec. 20, 2021

(65) Prior Publication Data

US 2022/0111591 A1    Apr. 14, 2022

Related U.S. Application Data

(63) Continuation of application No. 17/450,187, filed on Oct. 7, 2021, now Pat. No. 11,584,074, which is a (Continued)

(51) Int. Cl.
*B29C 64/245* (2017.01)
*B33Y 10/00* (2015.01)
(Continued)

(52) U.S. Cl.
CPC ............ *B29C 64/245* (2017.08); *B29C 64/00* (2017.08); *B29C 64/227* (2017.08);
(Continued)

(58) Field of Classification Search
CPC ........................... B29C 64/245; B29C 64/232
See application file for complete search history.

(56) References Cited

U.S. PATENT DOCUMENTS

| | | | |
|---|---|---|---|
| 5,939,008 A | 8/1999 | Comb et al. | |
| 6,177,182 B1 | 1/2001 | Nguyen | |

(Continued)

FOREIGN PATENT DOCUMENTS

| | | | |
|---|---|---|---|
| CN | 103121323 A | 5/2013 | |
| CN | 103231513 A | 8/2013 | |

(Continued)

OTHER PUBLICATIONS

Clare Scott, "Voodoo Manufacturing Tells Us About Automating 3D Printing With Project Skywalker", https://3dprint.com/167938/project-skywalker-voodoo/, (Published on Mar. 15, 2017), 3DR Holdings.

(Continued)

*Primary Examiner* — Kelly M Gambetta
*Assistant Examiner* — Virak Nguon
(74) *Attorney, Agent, or Firm* — DLA PIPER LLP (US)

(57) ABSTRACT

A system for autonomously creating subsequent physical objects using a 3-dimensional printer. The system includes a build platform which is ejected with a printed object adhered to it, with a replenishing mechanism to place a blank build platform into the expected build area such that printing a subsequent object may occur autonomously. The replenishing mechanism may draw from a plurality of stored blank build platforms which may be reusable in some embodiments and disposable in others.

14 Claims, 1 Drawing Sheet

Related U.S. Application Data continuation of application No. 15/929,740, filed on May 19, 2020, now Pat. No. 11,167,489, which is a continuation of application No. 15/800,973, filed on Nov. 1, 2017, now Pat. No. 10,710,302.

(60) Provisional application No. 62/416,428, filed on Nov. 2, 2016.

(51) Int. Cl.

| | |
|---|---|
| B29C 64/379 | (2017.01) |
| B29C 64/00 | (2017.01) |
| B33Y 40/20 | (2020.01) |
| B29C 64/255 | (2017.01) |
| B29C 64/295 | (2017.01) |
| B29C 64/393 | (2017.01) |
| B29C 64/227 | (2017.01) |
| B29C 64/106 | (2017.01) |
| B33Y 30/00 | (2015.01) |
| B33Y 50/02 | (2015.01) |
| B29C 64/205 | (2017.01) |

(52) U.S. Cl.
CPC .......... B29C 64/255 (2017.08); B29C 64/295 (2017.08); B29C 64/379 (2017.08); B29C 64/393 (2017.08); B33Y 10/00 (2014.12); B33Y 40/20 (2020.01); B29C 64/106 (2017.08); B29C 64/205 (2017.08); B33Y 30/00 (2014.12); B33Y 50/02 (2014.12)

(56) References Cited

U.S. PATENT DOCUMENTS

| | | | |
|---|---|---|---|
| 6,202,734 | B1 | 3/2001 | Sackinger et al. |
| 6,722,872 | B1 | 4/2004 | Swanson et al. |
| 7,383,768 | B2 | 6/2008 | Reichwein et al. |
| 7,585,450 | B2 | 9/2009 | Wahlstrom et al. |
| 7,600,547 | B2 | 10/2009 | Yang et al. |
| 7,690,909 | B2 | 4/2010 | Wahlstrom |
| 8,215,371 | B2 | 7/2012 | Batchelder |
| 8,387,167 | B2 | 3/2013 | Matsunobu et al. |
| 8,668,859 | B2 | 3/2014 | Pettis |
| 8,905,742 | B2 | 12/2014 | Knighton |
| 8,961,167 | B2 | 2/2015 | Swanson et al. |
| 8,994,592 | B2 | 3/2015 | Scott et al. |
| 9,085,098 | B2 | 7/2015 | Albrecht et al. |
| 9,085,130 | B2 | 7/2015 | Chen et al. |
| 9,289,946 | B2 | 3/2016 | Perez et al. |
| 10,751,951 | B1 | 8/2020 | Nguyen et al. |
| 11,110,658 | B2 | 9/2021 | Sieradzki |
| 2003/0014865 | A1 | 1/2003 | Nowak et al. |
| 2005/0220983 | A1 | 10/2005 | Hayes |
| 2007/0075461 | A1 | 4/2007 | Hunter et al. |
| 2008/0149299 | A1 | 6/2008 | Slaughter |
| 2008/0244887 | A1 | 10/2008 | Barlier et al. |
| 2009/0241997 | A1 | 10/2009 | Tafoya et al. |
| 2010/0090374 | A1 | 4/2010 | Dietrich et al. |
| 2010/0100222 | A1* | 4/2010 | Skubic ................. B29C 64/245 700/110 |
| 2010/0279007 | A1 | 11/2010 | Briselden et al. |
| 2013/0186558 | A1 | 7/2013 | Comb et al. |
| 2013/0287933 | A1 | 10/2013 | Kaiser et al. |
| 2013/0287934 | A1 | 10/2013 | Ramsundar |
| 2013/0327917 | A1 | 12/2013 | Steiner et al. |
| 2013/0344258 | A1 | 12/2013 | Covey |
| 2014/0014493 | A1 | 1/2014 | Ryan et al. |
| 2014/0035995 | A1 | 2/2014 | Chou et al. |
| 2014/0178588 | A1 | 6/2014 | Swanson et al. |
| 2014/0191439 | A1* | 7/2014 | Davis ................... B29C 64/245 425/375 |
| 2014/0220168 | A1 | 8/2014 | Perez et al. |
| 2015/0024169 | A1 | 1/2015 | Martin |
| 2015/0035209 | A1 | 2/2015 | Shah et al. |
| 2015/0054193 | A1 | 2/2015 | Meyer et al. |
| 2015/0060403 | A1 | 3/2015 | Carter et al. |
| 2015/0064047 | A1 | 3/2015 | Hyde et al. |
| 2015/0077215 | A1 | 3/2015 | Ranky et al. |
| 2015/0125335 | A1 | 5/2015 | Bruck et al. |
| 2015/0140158 | A1 | 5/2015 | Cervantes et al. |
| 2015/0210007 | A1 | 7/2015 | Durand et al. |
| 2015/0217367 | A1 | 8/2015 | Dickey et al. |
| 2015/0251360 | A1 | 9/2015 | Steele et al. |
| 2015/0276119 | A1 | 10/2015 | Booker |
| 2016/0096326 | A1 | 4/2016 | Naware |
| 2016/0167089 | A1 | 6/2016 | Ng et al. |
| 2016/0221262 | A1 | 8/2016 | Das et al. |
| 2016/0288415 | A1 | 10/2016 | Fromm et al. |
| 2016/0288416 | A1 | 10/2016 | Robles Flores et al. |
| 2017/0021419 | A1 | 1/2017 | Ng et al. |
| 2017/0036403 | A1 | 2/2017 | Ruff et al. |
| 2017/0106594 | A1 | 4/2017 | Gardiner et al. |
| 2017/0252819 | A1 | 9/2017 | Gibson et al. |
| 2017/0297320 | A1 | 10/2017 | Swanson et al. |
| 2018/0036801 | A1 | 2/2018 | Ishihara et al. |
| 2018/0169940 | A1 | 6/2018 | Dunne et al. |
| 2018/0169942 | A1 | 6/2018 | Jessen et al. |
| 2018/0222115 | A1 | 8/2018 | Watanabe et al. |
| 2018/0370133 | A1* | 12/2018 | Provencher ........... B29C 64/118 |
| 2019/0134909 | A1 | 5/2019 | Nicaise et al. |

FOREIGN PATENT DOCUMENTS

| | | |
|---|---|---|
| CN | 103481672 A | 1/2014 |
| CN | 103551572 A | 2/2014 |
| CN | 203485447 U | 3/2014 |
| CN | 203590485 U | 5/2014 |
| CN | 203992400 U | 12/2014 |
| CN | 104416159 A | 3/2015 |
| CN | 204249367 U | 4/2015 |
| CN | 104646670 A | 5/2015 |
| CN | 104889397 A | 9/2015 |
| CN | 104923782 A | 9/2015 |
| WO | 2015050886 A1 | 4/2015 |
| WO | 2015108574 A1 | 7/2015 |
| WO | 2015110600 A1 | 7/2015 |
| WO | 2015112998 A1 | 7/2015 |
| WO | 2015149054 A1 | 10/2015 |
| WO | 2016094329 A1 | 6/2016 |
| WO | 2016184994 A1 | 11/2016 |
| WO | 2017209337 A1 | 12/2017 |

OTHER PUBLICATIONS

Cverna, Thermal Properties of Metals, 2002, ASM International, Table 5.2 Melting Point for Pure Metals and Eutectic Alloys (Year: 2002).

* cited by examiner

SYSTEM FOR AUTOMATED SUCCESSIVE THREE-DIMENSIONAL PRINTING

CLAIM OF PRIORITY

This application is a continuation of U.S. patent application Ser. No. 17/450,187 filed on Oct. 7, 2021, entitled "System and Method for Automated Successive Three-Dimensional Printing", which claims priority to U.S. patent application Ser. No. 15/929,740 filed on May 19, 2020, entitled "System and Method for Automated Successive Three-Dimensional Printing", which claims priority to U.S. patent application Ser. No. 15/800,973 filed on Nov. 1, 2017, entitled "System and Method for Automated Successive Three-Dimensional Printing", which claims priority to U.S. Provisional Patent Application No. 62/416,428 filed on Nov. 2, 2016, also entitled "System and Method for Automated Successive Three-Dimensional Printing", the contents of all of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to a system for automated successive three-dimensional printing. More particularly, the present disclosure relates to a system for automated successive three-dimensional printing which can operate without a human being present.

BACKGROUND

Additive manufacturing (also known as "3D printing") is performed by a special-purpose device which operates by depositing thin layers of thermoplastic or other reformable or reactive material onto a flat planar surface. This is done by depositing said material between precise points until the sum of all layers forms the ultimate shape of a desired object. One requirement that this type of system has is that the first layer of material deposited on the build surface must adhere to that surface. This adhesion is important because it ensures that the forces of the subsequent material being deposited does not change the position of the first layer relative to all subsequent layers. While a lateral shift of any layer results in inaccurate printing, a shift in the first layer typically results in catastrophic failure of the print job.

This adhesion requirement introduces a certain "Goldilocks" paradigm: a print surface must provide sufficient adhesion such that the risk of first layer detachment over the course of a print job is sufficiently low, yet not so much adhesion that the desired object is now permanently fused to the build platform. Put simply, a build platform that provides too much adhesion requires significant physical force to remove the object, while a build platform with too little adhesion causes the printer to be unreliable or inaccurate.

Already existing in the art are a number of solutions to address this adhesion requirement, however each solution has significant limitations or drawbacks. Such solutions include painter's tape, ultra-hold hair spray, and polyimide tape. Each of these materials are produced by a variety of companies, each with their own specific chemical formulations. However, a common drawback of all these materials is that they lack staying power. That is, they all wear out or become damaged during the removal of the print, possibly after only a single use.

Another solution to the adhesion requirement of 3D printing is to have the build platform be inherently adhesive. To address ejecting the printed objects, some of these build platforms are constructed out of a flexible base material, which allows the end user to apply a bending force to the build platform to unstick the printed object from the build platform.

Regardless of the composition of the build platform, most 3D printers that exist today merely leave the completed object on the build platform, waiting for the user to manually remove the object so that the next print job can initialize. This creates a bottleneck in the production of 3D-printed objects, preventing 3D printing from being used as a manufacturing tool. Because of this, 3D printers cannot automatically process their print queues, and cannot be operated with any kind of autonomy. For 3D printers to fulfill the vision as deliverers of digital ideas into our physical world, a mechanism for removing a print job from the build platform is necessary.

One solution to this automated ejection problem is the "Automated Build Platform" product offered as an aftermarket add-on kit by MakerBot Industries, disclosed in U.S. Pat. Nos. 8,282,380 and 8,287,794. There, the build platform surface is constructed out of a thin, flexible substance concatenated with itself to form a closed-loop, movable conveyor belt, supported by an underlying flat hard surface. Once printing is completed, the conveyor belt advances using the rotational force of motorized frictional cylinders on one end, and the object detaches from the flexible surface at the rotating point, also pushing it from the completed build platform. The movement of the build surface as a conveyor belt both provides the detaching force at the rotation point as well as the linear movement of the object out of the build space. However, when implemented in real-world printers, warping of the object proved to be an insurmountable problem as a print bed that ejects warped objects is not functional. That is, the upward curling force of uneven thermoplastic cooling was too great for the thin surface material to counteract, and objects with large surface areas were either too warped to be acceptable, warped to the point of causing catastrophic print failure, or in the event of a small object not being large enough to warp, too well-adhered to be removed by the rotating force of the surface. Attempts were made to correct this by constructing the build platform out of thin metal, like titanium. Notwithstanding the dramatically increased cost of a titanium build platform, large objects still produced the devastating warping effects that the thin metal couldn't counteract.

Another solution that exists today is taught in U.S. Pat. No. 9,289,946. That solution leverages the mechanical advantage of a wedge and uses a blade to apply a separating force to break the bonds between the bottom surface of the printed object and the printing surface. Further, the blade's motion-path back to its starting position doubles as the force to push the now-separated object out from the build volume. Alternatively, this blade/wedge-separation method may employ a secondary, separate device to remove the object from the print area after separation to similar effectiveness at the cost of increased expenses and mechanical complexity, should there be an engineering reason to do so. However, this solution is mechanically complex and has limits on the size of objects that can be ejected because as an object's bottom surface area increases, the force of adhesion between the object and the build platform increases as well. Therefore, the force needed to drive a blade underneath the first layer of the build object increases drastically with the footprint of the build object. Additionally, the blade may dull over time, requiring sharpening or replacement, adding to a printer's maintenance overhead. The blade also requires exact calibration, as the blade must run along the surface of the build platform, but not cause damage or excessive wear to it. Finally, this mechanism requires additional space alongside an arbitrary axis of the build surface area, decreasing the printer-size-to-build-volume ratio of the 3D printer.

The most prolific automated solution to ejecting printed objects from the build platform is the automated application of a large brute force on the completed object. This force is sufficient such that the bottom layer of the printed object detaches from the build platform and the object's momentum moves it out from the printer's build volume, freeing the printer to initialize a subsequent print. This is achieved via a dedicated ramming device or via the print head itself. The success of this method is firstly dependent on the condition that the force on the object is sufficient such that separation occurs between the object and the build platform, as there is no mechanical advantage to this method. In the case of using the print head to ram the object off the build platform, the components that support the print head must be able to withstand this force. Typically, the supports are precision-machined guide rods, which, for small objects, are sufficient. However, for large objects with a high degree of adhesion to the build surface, the force of impact may be sufficient to permanently deform the rods that allow the motion of the print head, effectively breaking the printer until they are replaced. This method also requires that the adhesion between layers of the object is higher than the adhesion between the object and the build surface, otherwise the object would shear at an arbitrary z-height, which could cause either errors or breakage of the printer when attempting to print the next object. With this method being effective only for printed objects that are strong in their inherent shape and small in their surface area contact with the print platform, this method leaves much to be desired.

Another solution is taught by International Patent Application No.: WO 2015/116639. This invention consists of two critical components: a flexible, flat planar build surface; and a two-part mechanical system to deform this surface along one axis and then also to vacate the now-freed completed object from the build surface. The combination of deformable planar surface and mechanical system serve to replace the need for human labor to clear a printer's build surface for a subsequent print to commence. This method is dependent on the aforementioned "Goldilocks" build platforms which are constructed out of a flexible metal surface coated with a substance that increases desirable adhesion properties between printed plastic and the build platform, or a flexible non-metal material that inherently has desirable adhesion properties. Between the coated-metal vs. proprietary inherent material flexible products, flatness of the build surface is difficult to achieve or is highly expensive. Additionally, the natural fatigue of both metal and polymer flexible build products must be considered. After certain flex/flatten cycles, the material may either begin to crack or degrade from the stress, or possibly no longer be able to return to a fully flattened state—a hard-stop for accurate 3D printing, again leaving much room for improvement.

As can be seen based on the above solution, the current state of the art only provides very compromised options, either limiting the type of object that can be printed or adding significant mechanical complexity and chemical-manufacturing dependencies to the 3D printer itself.

While these units may be suitable for the particular purpose employed, or for general use, they would not be as suitable for the purposes of the present disclosure as disclosed hereafter.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

SUMMARY

The present disclosure provides a print area, for accepting and subsequently ejecting an object printed thereon by a 3-dimensional printer, the print area comprising a build plane, a deformable build platform, and an actuating mechanism, configured to actuate and deform the deformable build platform, preferably where the deformable build platform is composed of a single consecutive material having a single continuous top surface, preferably where the top surface is even with the build plane.

In an embodiment, the deformable build platform is shaped as a single spiral cut from its exterior to the center of its interior.

In an embodiment, the actuating mechanism is configured to actuate a center of the deformable build platform along a vertical axis of the build plane such that the top surface of the deformable build platform deforms and is displaced away from the build plane or towards the build plane.

In an embodiment, the top surface of the deformable build platform forms a concave shape when it is displaced away from the build plane.

In an embodiment, the top surface of the deformable build platform forms a convex shape when it is displaced away from the build plane.

In an embodiment, the top surface of the deformable build platform forms a conical shape when it is displaced away from the build plane In an embodiment, the actuating mechanism actuates the deformable build platform to be displaced away from the build plane when an object is finished printing on the build surface, such that the displacement is sufficient to break any bonds between the object and the top surface of the build plane.

In an embodiment, the actuating mechanism has at least a fully extended mode and a fully collapsed mode.

In an embodiment, the top surface of the deformable build platform deforms away from the build plane when the actuating mechanism is in the fully extended mode, and the top surface is even with the build plane when the actuating mechanism is in the fully collapsed mode.

In an embodiment, the top surface of the deformable build platform forms a convex shape when the actuating mechanism is in the fully extended mode.

In an embodiment, the actuating mechanism enters the fully extended mode when an object is finished printing on the build surface, such that the deforming of the top surface of the deformable build platform is sufficient to break any bonds between the object and the top surface of the build plane.

In an embodiment, the top surface of the deformable build platform deforms away from the build plane when the actuating mechanism is in the fully collapsed mode, and the top surface is even with the build plane when the actuating mechanism is in the fully extended mode.

In an embodiment, the top surface of the deformable build platform forms a concave shape when the actuating mechanism is in the fully collapsed mode.

In an embodiment, the actuating mechanism enters the fully collapsed mode when an object is finished printing on the build surface, such that the deforming of the top surface of the deformable build platform is sufficient to break any bonds between the object and the top surface of the build plane.

Finally, the present disclosure teaches a print area, for accepting and subsequently ejecting an object printed thereon by a 3-dimensional printer, the print area comprising: a build plane; a build platform comprising a telescoping cylinder with a single spiral cut; an actuator, which provides the telescoping motion of the build platform; wherein the actuator allows the build platform to rise above the build plane.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

Figure 1A:
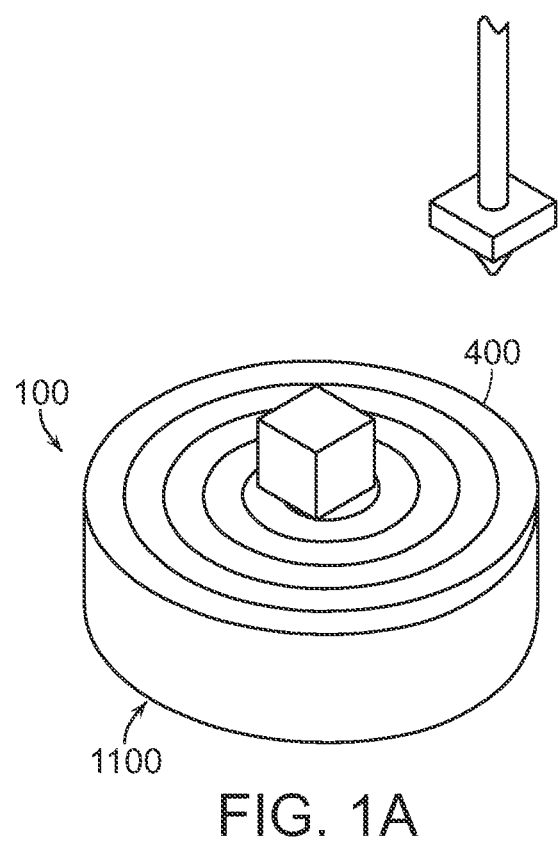
FIG. 1A is a perspective view of an example embodiment of the build platform according to the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Exhibited below are several solutions for solving the problem of printing subsequent objects using additive manufacturing hardware without human intervention between each such print jobs.

An embodiment of the print area according to the present disclosure is provided. Here, the print area includes a plurality of vertically-stacked build platforms 100 housed inside a replenishing mechanism, a push mechanism, and a build plane 400. Each of the build platforms 100 has a top surface, a bottom surface, and a plurality of walls extending between the top surface and the bottom surface. The top surface is configured to have a 3D-printed object 1000 adhere to it. This is true whether the 3D printer employs fused deposition modeling ("FDM"), fused filament fabrication ("FFF"), or stereolithography ("SLA"). The replenishing mechanism contains a vertical actuator which has a top end, a lift platform connected to the top end, and a holding bracket with a perimeter. The vertical actuator, the lift platform, and the plurality of build platforms 100 are contained within the perimeter. The build plane 400 is level with the top of the replenishing mechanism.

In an embodiment, automation is achieved by ejecting the entire build platform 100 upon which the object 1000 is printed on. Upon ejection of this build platform 100, the replenishing mechanism shall lift, via the lift platform and the vertical actuator, an additional build platform 100 such that the top surface is in line with the build plane 400. This insertion of the blank build platform 100 allows the printer to commence a new print in its print queue. This has the benefit of allowing the 3D printer to autonomously and sequentially print a number of the objects 1000 regardless of a human's availability to remove the objects 1000 from the build platforms 100. Preferably, the end-user of the printer may come at a later point and remove the object 1000 from the ejected platform 100. In some embodiments, the build platform 100 is disposable, but in other embodiments the build platform 100 is reusable. One way in which the build platform 100 could be reusable would be to insert the used build platform 100, after the object 1000 has been disjoined, into the bottom of a stack of queued-up blank build platforms 100. Alternative embodiments exist where the build platforms 100 are not vertically-stacked but are in a carousel where the build platforms 100 are rotated into the appropriate position to receive the object 1000. These build platforms 100 can be constructed out of any type of material currently in use for build platforms, as described in the background, above. The embodiment of the print area has the benefit of keeping the x/y coordinate footprint relatively unharmed in between print jobs.

While in an embodiment, the print area is suitable for printing methods where the print head is located above the build platform 100, it is similarly suitable for use with printers where a laser or imaging source is located beneath the build platform 100, operating in an inverted manner from what is pictured.

Figure 1B:
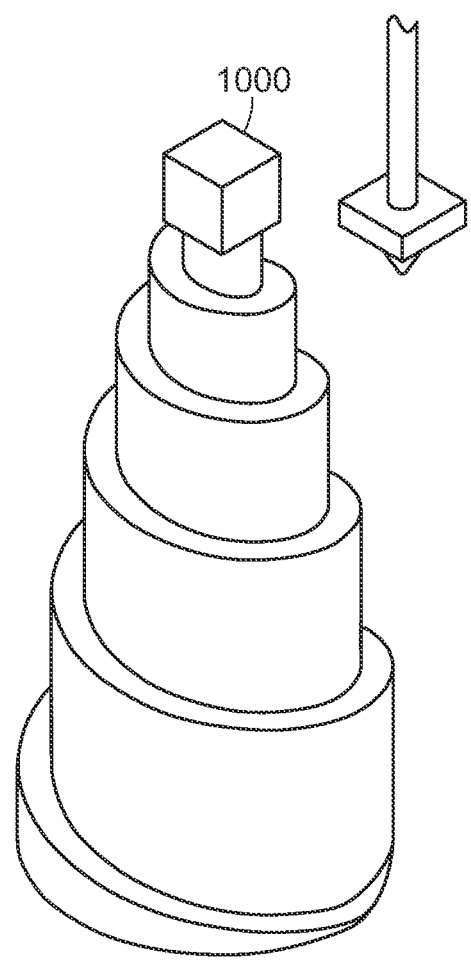
FIG. 1B is a perspective view of the build platform of FIG. 1A, with the dynamic top surface ejecting the print object.

With reference to FIGS. 1A and 1B, an embodiment of the print area according to the present invention is disclosed where the print area includes the build plane 400, the build platform 100, and an actuating mechanism 1100. Here the build platform 100 is one consecutive material with a single spiral cut from its exterior to the center of its interior. The actuating mechanism 1100 will act at the interior terminal point of the spiral to manipulate the build platform 100 from being in line with the build plane 400 to either a concave or convex conical shape, as shown in FIG. 1B. This actuation will provide force to break the bonds between the bottom layer of the object 1000 and the top surface.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a system for automated successive three-dimensional printing. The disclosure is illustrated by example in the drawing figures, and throughout the written description. It should be understood that numerous variations are possible while adhering to the inventive concept. Such variations are contemplated as being a part of the present disclosure.

What is claimed is:

1. A print area, for accepting and subsequently ejecting an object printed thereon by a 3-dimensional printer, the print area comprising:
   a build plane;
   a deformable build platform comprising a telescoping cylinder; and
   an actuating mechanism, configured to actuate and deform the deformable build platform in a telescoping manner,
      wherein a top surface of the deformable build platform is even with the build plane.

2. The print area of claim 1, wherein the deformable build platform is shaped as a single spiral cut from its exterior to the center of its interior.

3. The print area of claim 1, wherein the actuating mechanism is configured to actuate a center of the deformable build platform along a vertical axis of the build plane such that the top surface of the deformable build platform deforms and is displaced away from the build plane or towards the build plane.

4. The print area of claim 3, wherein the top surface of the deformable build platform forms a concave shape when it is displaced away from the build plane.

5. The print area of claim 3, wherein the top surface of the deformable build platform forms a convex shape when it is displaced away from the build plane.

6. The print area of claim 3, wherein the top surface of the deformable build platform forms a conical shape when it is displaced away from the build plane.

7. The print area of claim 3, wherein the actuating mechanism actuates the deformable build platform to be displaced away from the build plane when an object is finished printing on the build top surface, such that the displacement is sufficient to break any bonds between the object and the top surface of the build plane.

8. The print area of claim 1, wherein the actuating mechanism has at least a fully extended mode and a fully collapsed mode.

9. The print area of claim 8, wherein the top surface of the deformable build platform deforms away from the build plane when the actuating mechanism is in the fully extended mode, and the top surface is even with the build plane when the actuating mechanism is in the fully collapsed mode.

10. The print area of claim 9, wherein the top surface of the deformable build platform forms a convex shape when the actuating mechanism is in the fully extended mode.

11. The print area of claim 9, wherein the actuating mechanism enters the fully extended mode when an object is finished printing on the build top surface, such that the deforming of the top surface of the deformable build platform is sufficient to break any bonds between the object and the top surface of the build plane.

12. The print area of claim 8, wherein the top surface of the deformable build platform deforms away from the build plane when the actuating mechanism is in the fully collapsed mode, and the top surface is even with the build plane when the actuating mechanism is in the fully extended mode.

13. The print area of claim 12, wherein the top surface of the deformable build platform forms a concave shape when the actuating mechanism is in the fully collapsed mode.

14. The print area of claim 12, wherein the actuating mechanism enters the fully collapsed mode when an object is finished printing on the top surface, such that the deforming of the top surface of the deformable build platform is sufficient to break any bonds between the object and the top surface of the build plane.

* * * * *